US010733812B2

(12) United States Patent
Nyalamadugu et al.

(10) Patent No.: US 10,733,812 B2
(45) Date of Patent: Aug. 4, 2020

(54) SELF DECLARING DEVICE FOR A VEHICLE USING RESTRICT TRAFFIC LANES

(71) Applicant: Neology, Inc., San Diego, CA (US)

(72) Inventors: Sheshi Nyalamadugu, San Diego, CA (US); Joe Mullis, Oceanside, CA (US); Bobby Leanio, Ernst (NL)

(73) Assignee: NEOLOGY, INC., San Diego, CA (US)

( * ) Notice: Subject to any disclaimer, the term of this patent is extended or adjusted under 35 U.S.C. 154(b) by 0 days.

(21) Appl. No.: 16/539,764

(22) Filed: Aug. 13, 2019

(65) Prior Publication Data

US 2019/0371083 A1 Dec. 5, 2019

Related U.S. Application Data

(63) Continuation of application No. 16/147,114, filed on Sep. 28, 2018, now Pat. No. 10,388,079, which is a
(Continued)

(51) Int. Cl.
*G07B 15/06* (2011.01)
*B60N 2/00* (2006.01)
(Continued)

(52) U.S. Cl.
CPC .......... *G07B 15/063* (2013.01); *B60N 2/002* (2013.01); *G06K 19/041* (2013.01);
(Continued)

(58) Field of Classification Search
CPC .................................................. G06B 15/068
(Continued)

(56) References Cited

U.S. PATENT DOCUMENTS 5,337,063 A 8/1994 Takahira
5,809,142 A 9/1998 Hurta et al.
(Continued)

FOREIGN PATENT DOCUMENTS

CN 102332634 A 1/2012
DE 19742126 A1 3/1999
(Continued)

OTHER PUBLICATIONS

Petitioner's Reply to Patent Owner's Response, Inter Partes Review of U.S. Pat. No. 8,944,337, IPR Case No. IPR2016-01763, Paper No. 16, filing date Sep. 21, 2017, pp. 1-39.
(Continued)

*Primary Examiner* — Allyson N Trail
(74) *Attorney, Agent, or Firm* — Procopio, Cory, Hargreaves & Savitch LLP; Mark W. Catanese

(57) ABSTRACT

The present disclosure provides various examples of a self-declaring wireless device installed on a vehicle operable to automatically detect, determine and declare occupancy information of the vehicle traveling on a restricted traffic lane to an electronic toll collection (ETC) system. According to one aspect, a process for performing self-declaration by a vehicle traveling on a restricted traffic lane includes the steps of: receiving sensor data collected by one or more sensors installed on the vehicle; determining occupancy data of the vehicle based on the received sensor data; and controlling a wireless transceiver installed on the vehicle to communicate with an electronic toll collection (ETC) system associated with the restricted traffic lane based on the determined occupancy data.

19 Claims, 5 Drawing Sheets

Related U.S. Application Data continuation of application No. 15/225,779, filed on Aug. 1, 2016, now Pat. No. 10,102,685, which is a continuation-in-part of application No. 14/578,196, filed on Dec. 19, 2014, now Pat. No. 9,582,746, which is a continuation of application No. 14/060,407, filed on Oct. 22, 2013, now Pat. No. 8,944,337, which is a continuation of application No. 13/465,834, filed on May 7, 2012, now Pat. No. 8,561,911.

(60) Provisional application No. 61/487,372, filed on May 18, 2011, provisional application No. 61/483,586, filed on May 6, 2011, provisional application No. 62/199,993, filed on Aug. 1, 2015.

(51) Int. Cl.
  *G06Q 20/10* (2012.01)
  *G06K 19/04* (2006.01)
  *G06K 19/073* (2006.01)
  *G06K 19/077* (2006.01)
  *G08G 1/017* (2006.01)

(52) U.S. Cl.
  CPC .. *G06K 19/07345* (2013.01); *G06K 19/07715* (2013.01); *G06Q 20/102* (2013.01); *G08G 1/017* (2013.01)

(58) Field of Classification Search
  USPC ............................. 235/492, 375, 385; 703/13
  See application file for complete search history.

(56) References Cited

U.S. PATENT DOCUMENTS

| | | |
|---|---|---|
| 6,342,839 B1 | 1/2002 | Curkendall et al. |
| 6,466,131 B1 | 10/2002 | Tuttle et al. |
| 7,782,206 B2 | 8/2010 | Burnett et al. |
| 7,859,393 B2 | 12/2010 | Suzuki et al. |
| 8,065,181 B2 | 11/2011 | McNew et al. |
| 8,350,673 B2 | 1/2013 | Nyalamadugu et al. |
| 8,561,911 B2 | 10/2013 | Mullis et al. |
| 8,710,960 B2 | 4/2014 | Nyalamadugu et al. |
| 9,098,790 B2 | 8/2015 | Nyalamadugu et al. |
| 2001/0048361 A1 | 12/2001 | Mays et al. |
| 2003/0016136 A1 | 1/2003 | Harvey |
| 2003/0116634 A1 | 6/2003 | Tanaka |
| 2003/0132301 A1 | 7/2003 | Selker |
| 2004/0188531 A1 | 9/2004 | Gengel et al. |
| 2005/0012616 A1 | 1/2005 | Forster et al. |
| 2005/0038347 A1 | 2/2005 | Suzuki |
| 2005/0038736 A1 | 2/2005 | Saunders |
| 2005/0237198 A1 | 10/2005 | Waldner et al. |
| 2005/0242950 A1 | 11/2005 | Lindsay et al. |
| 2005/0242957 A1 | 11/2005 | Lindsay et al. |
| 2006/0054710 A1 | 3/2006 | Forster et al. |
| 2006/0125603 A1 | 6/2006 | Nahear |
| 2006/0132313 A1 | 6/2006 | Moskowitz |
| 2006/0145851 A1 | 7/2006 | Posamentier |
| 2007/0008140 A1 | 1/2007 | Saarisalo et al. |
| 2007/0069858 A1 | 3/2007 | Kubo |
| 2007/0075837 A1 | 4/2007 | Tuttle et al. |
| 2007/0109101 A1 | 5/2007 | Colby |
| 2007/0144662 A1 | 6/2007 | Armijo et al. |
| 2007/0200681 A1 | 8/2007 | Colby |
| 2007/0200682 A1 | 8/2007 | Colby |
| 2007/0210923 A1 | 9/2007 | Butler et al. |
| 2007/0268140 A1 | 11/2007 | Tang et al. |
| 2007/0279231 A1 | 12/2007 | Cheng et al. |
| 2007/0285246 A1 | 12/2007 | Koyama |
| 2007/0290856 A1 | 12/2007 | Martin |
| 2008/0084310 A1 | 4/2008 | Nikitin et al. |
| 2008/0147461 A1 | 6/2008 | Lee et al. |
| 2008/0211675 A1 | 9/2008 | Forster et al. |
| 2008/0218344 A1 | 9/2008 | Lazar |
| 2008/0238679 A1 | 10/2008 | Rofougaran et al. |
| 2008/0265039 A1 | 10/2008 | Skowronek et al. |
| 2008/0308641 A1 | 12/2008 | Finn |
| 2009/0096611 A1 | 4/2009 | Jones |
| 2009/0219158 A1 | 9/2009 | Nikitin et al. |
| 2010/0026468 A1 | 2/2010 | Nyalamadugu et al. |
| 2010/0079289 A1 | 4/2010 | Brandt et al. |
| 2010/0230498 A1 | 9/2010 | Atherton |
| 2010/0283690 A1 | 11/2010 | Artigue et al. |
| 2010/0302012 A1 | 12/2010 | Roesner |
| 2011/0006959 A1 | 1/2011 | Menko et al. |
| 2011/0309931 A1 | 12/2011 | Rose |
| 2012/0161937 A1 | 6/2012 | Chen |
| 2012/0217928 A1 | 8/2012 | Kulidjian et al. |
| 2012/0248929 A1 | 10/2012 | Fish et al. |
| 2012/0280044 A1 | 11/2012 | Mullis et al. |
| 2012/0287249 A1 | 11/2012 | Choo et al. |
| 2013/0105584 A1 | 5/2013 | Forster |
| 2014/0074566 A1 | 3/2014 | McCoy et al. |
| 2014/0278841 A1 | 9/2014 | Natinsky |
| 2015/0021389 A1 | 1/2015 | Gravelle |
| 2015/0070181 A1 | 3/2015 | Fadell et al. |
| 2015/0077297 A1 | 3/2015 | Forster |
| 2017/0048280 A1 | 2/2017 | Logue et al. |

FOREIGN PATENT DOCUMENTS

| | | |
|---|---|---|
| EP | 1087332 A1 | 3/2001 |
| EP | 2056234 A2 | 5/2009 |
| FR | 2757952 B1 | 3/1999 |
| WO | 2012025787 A1 | 3/2012 |

OTHER PUBLICATIONS

Fischer Deposition Exhibit 1023—Annotated Excerpt from U.S. Pat. No. 8,944,337, Inter Partes Review of U.S. Pat. No. 8,944,337, IPR Case No. IPR2016-01763, Exhibit No. 1023, exhibit filing date Sep. 21, 2017, p. 1.

Petitioner's Opposition to Patent Owner's Contingent Motion to Amend, Inter Partes Review of U.S. Pat. No. 8,944,337, IPR Case No. IPR2016-01763, Paper No. 17, filing date Sep. 21, 2017, pp. 1-32.

Petitioner's Amended Appendix of Exhibits, Inter Partes Review of U.S. Pat. No. 8,944,337, IPR Case No. IPR2016-01763, Paper No. 18, filing date Sep. 21, 2017, pp. 1-5.

Fischer Deposition Exhibit 1021—Annotated Excerpt from U.S. Pat. No. 8,944,337, Inter Partes Review of U.S. Pat. No. 8,944,337, IPR Case No. IPR2016-01763, Exhibit No. 1021, exhibit filing date Sep. 21, 2017, p. 1.

Fischer Deposition Exhibit 1022—Annotated Excerpt from U.S. Pat. No. 8,944,337, Inter Partes Review of U.S. Pat. No. 8,944,337, IPR Case No. IPR2016-01763, Exhibit No. 1022, exhibit filing date Sep. 21, 2017, p. 1.

Fischer Deposition Exhibit 1026—Handwritten Diagram, Inter Partes Review of U.S. Pat. No. 8,944,337, IPR Case No. IPR2016-01763, Exhibit No. 1026, exhibit filing date Sep. 21, 2017, p. 1.

Instructables: Pull Out Birthday Card, Inter Partes Review of U.S. Pat. No. 8,944,337, IPR Case No. IPR2016-01763, Exhibit No. 1030, exhibit filing date Sep. 21, 2017, pp. 1-6.

Fischer Deposition Exhibit 1024—Annotated Excerpt from U.S. Pat. No. 8,944,337, Inter Partes Review of U.S. Pat. No. 8,944,337, IPR Case No. IPR2016-01763, Exhibit No. 1024, exhibit filing date Sep. 21, 2017, p. 1.

Fischer Deposition Exhibit 1025—U.S. Patent Application Publication No. US 2010/0283690 A1 to Artigue et al., Inter Partes Review of U.S. Pat. No. 8,944,337, IPR Case No. IPR2016-01763, Exhibit No. 1025, exhibit filing date Sep. 21, 2017, pp. 1-12.

Deposition of Jim Fischer, IPR Case No. 2016-01763, Sep. 8, 2017, Inter Partes Review of U.S. Pat. No. 8,944,337, IPR Case No. IPR2016-01763, Exhibit No. 1027, exhibit filing date Sep. 21, 2017, pp. 1-364.

Kaplan, Steven M., Excerpt from Wiley Electrical and Electronics Engineering Dictionary (2004), Inter Partes Review of U.S. Pat. No.

(56) References Cited

OTHER PUBLICATIONS 8,944,337, IPR Case No. IPR2016-01763, Exhibit No. 1028, exhibit filing date Sep. 21, 2017, pp. 1-4.
Excerpt from Merriam-Webster's Collegiate Dictionary (10th ed. 2002), Inter Partes Review of U.S. Pat. No. 8,944,337, IPR Case No. IPR2016-01763, Exhibit No. 1029, exhibit filing date Sep. 21, 2017, pp. 1-8.
Declaration of Bruce Roesner in Support of petitioner's Opposition to Patent Owner's Contingent Motion to Amend, Inter partes review of U.S. Pat. No. 8,944,337, IPR Case No. IPR2016-01763, Exhibit No. 1031, exhibit filing date Sep. 21, 2017, pp. 1-35.
U.S. Pat. No. 9,582,746, to Mullis et al., Inter Partes Review of U.S. Pat. No. 8,944,337, IPR Case No. IPR2016-01763, Exhibit No. 1032, exhibit filing date Sep. 21, 2017, pp. 1-17.
Kraus, John D., Excerpts from Antennas 2nd Ed., Inter Partes Review of U.S. Pat. No. 8,944,337, IPR Case No. IPR2016-01763, Exhibit No. 2051, exhibit filing date Oct. 19, 2017, pp. 1-8.
Keyrouz et al., Novel Empirical Equations to Calculate the Impedance of a Strip Dipole Antenna, Dec. 2013, Inter Partes Review of U.S. Pat. No. 8,944,337, IPR Case No. IPR2016-01763, Exhibit No. 2046, exhibit filing date Oct. 19, 2017, pp. 1-4.
Jamaluddin et al., Microstrip Dipole Antenna Analysis with Different Width and Length at 2.4 GHz, Dec. 2005, Inter Partes Review of U.S. Pat. No. 8,944,337, IPR Case No. IPR2016-01763, Exhibit No. 2047, exhibit filing date Oct. 19, 2017, pp. 1-4.
Pozar, David M., Excerpts from Microwave Engineering 4th Ed., Inter Partes Review of U.S. Pat. No. 8,944,337, IPR Case No. IPR2016-01763, Exhibit No. 2052, exhibit filing date Oct. 19, 2017, pp. 1-3.
Reply to Petitioner's Opposition to Contingent Motion to Amend, Inter Partes Review of U.S. Pat. No. 8,944,337, IPR Case No. IPR2016-01763, Paper No. 20, filing date Oct. 19, 2017, pp. 1-19.
Supplemental Fischer Declaration ISO PO's Motion to Amend, Inter Partes Review of U.S. Pat. No. 8,944,337, IPR Case No. IPR2016-01763, Exhibit No. 2044, exhibit filing date Oct. 19, 2017, pp. 1-36.
Petitioner's Sur-Reply To patent Owner's Reply To Petition's Opposition To Patent Owner's Contingent Motion To Amend, Inter Partes Review of U.S. Pat. No. 8,944,337, IPR Case No. IPR2016-01763, Paper No. 31, filing date Nov. 17, 2017, pp. 1-18.
Fischer Deposition Exhibit 1035A: Model, Inter Partes Review of U.S. Pat. No. 8,944,337, IPR Case No. IPR2016-01763, Exhibit No. 1035A, exhibit filing date Nov. 17, 2017, p. 1.
Declaration of Bruce Roesner, Inter Partes Review of U.S. Pat. No. 8,944,337, IPR Case No. IPR2016-01763, Exhibit No. 1049, exhibit filing date Nov. 17, 2017, pp. 1-93.
Boylestad, Robert L., Excerpt from Introductory Circuit Analysis, 2007, Inter Partes Review of U.S. Pat. No. 8,944,337, IPR Case No. IPR2016-01763, Exhibit No. 1053, exhibit filing Nov. 17, 2017, pp. 1-4.
Stein, Jess (Editor), Excerpt from the Random House Dictionary of the English Language, 1966, Inter Partes Review of U.S. Pat. No. 8,944,337, IPR Case No. IPR2016-01763, Exhibit No. 1050, exhibit filing date Nov. 17, 2017, pp. 1-5.
U.S. Pat. No. 6,121,544, to Petsinger (issued Sep. 19, 2000), Inter Partes Review of U.S. Pat. No. 8,944,337, IPR Case No. IPR2016-01763, Exhibit No. 1051, exhibit filing date Nov. 17, 2017, pp. 1-16.
U.S. Pat. No. 8,604,995, to Hammad (issued Dec. 10, 2013), Inter Partes Review of U.S. Pat. No. 8,944,337, IPR Case No. IPR2016-01763, Exhibit No. 1052, exhibit filing date Nov. 17, 2017, pp. 1-15.
Balanis, Constantine A., Excerpts from Antenna Theory, Inter Partes Review of U.S. Pat. No. 8,944,337, IPR Case No. IPR2016-01763, Exhibit No. 2056, exhibit filing date Dec. 6, 2017, pp. 1-4.
Petitioner's Motion to Exclude, Inter Partes Review of U.S. Pat. No. 8,944,337, IPR Case No. IPR2016-01763, Paper No. 38, filing date Dec. 6, 2017, pp. 1-14.
Lehpamer, Harvey, Excerpts from RFID Design Principles, Inter Partes Review of U.S. Pat. No. 8,944,337, IPR Case No. IPR2016-01763, Exhibit No. 2057, exhibit filing date Dec. 6, 2017, pp. 1-14.
Finkenzeller, Klaus, Excerpts from RFID Handbook, Inter Partes Review of U.S. Pat. No. 8,944,337, IPR Case No. IPR2016-01763, Exhibit No. 2058, exhibit filing date Dec. 6, 2017, pp. 1-24.
European Search Report issued in European Patent Application No. 09708616.9 dated May 9, 2011 (9 pages).
International Search Report and Written Opinion for PCT/US2009/032840 dated May 26, 2009, 6 pages.
International Search Report and Written Opinion for PCT/US2016/033636, dated Aug. 30, 2016, 12 pages.
International Search Report received in corresponding International Application No. PCT/US2012/036654, dated Nov. 16, 2012, 5 pages.
International Search Report and Written Opinion for PCT/US2016/045066 dated Nov. 11, 2016, 11 pages.
International Search Report and Written Opinion for PCT/US2016/045069 dated Oct. 21, 2016, 9 pages.
European Search Report for EP Application No. 12782498.5 dated Mar. 12, 2015 (6 pages).
PCT International Publication No. 2008/074050 A1, to Peter Samuel Atherton, Inter partes Review of U.S. Pat. No. 8,944,337, IPR Case No. IPR2016-01763, Exhibit No. 1006, exhibit filing date Sep. 9, 2016, pp. 1-21.
Declaration of Bruce Roesner in Support of Petition, inter Partes Review of U.S. Pat. No. 8,944,337, IPR Case No. IPR2016-01763, Exhibit No. 1001, exhibit filing date Sep. 9, 2016, pp. 1-89.
U.S. Pat. No. 8,944,337, to Mullis et al., Inter partes Review of U.S. Pat. No. 8,944,337, IPR Case No. IPR2016-01763, Exhibit No. 1004, exhibit filing date Sep. 9, 2016, pp. 1-17.
U.S. Pat. No. 7,460,018, to Yuki Kubo, issued Dec. 2, 2008, Inter Partes Review of U.S. Patent No. 8,944,337, IPR Case No. IPR2016-01763, Exhibit No. 1007, exhibit filing date Sep. 9, 2016, pp. 1-13.
U.S. Patent Application Publication No. 2007/0290858, to Janke et al., Inter Partes Review of U.S. Pat. No. 8,944,337, IPR Case No. IPR2016-01763, Exhibit No. 1008, exhibit filing date Sep. 9, 2016, pp. 1-5.
U.S. Pat. No. 8,350,673, to Nyalamadugu et al., issued Jan. 8, 2013, Inter Partes Review of U.S. Pat. No. 8,944,337, IPR Case No. IPR2016-01763, Exhibit No. 1012, exhibit filing date Sep. 9, 2016, pp. 1-9.
U.S. Patent No. 674,284, to G.A. Sachs, issued May 14, 1901, Inter Partes Review of U.S. Pat. No. 8,944,337, IPR Case No. IPR2016-01763, Exhibit No. 1015, exhibit filing date Sep. 9, 2016, pp. 1-6.
U.S. Patent Application Publication No. 2007/0144662, to Armijo et al., Inter Partes Review of U.S. Pat. No. 8,944,337, IPR Case No. IPR2016-01763, Exhibit No. 1016, exhibit filing date Sep. 9, 2016, pp. 1-13.
U.S. Pat. No. 7,361,251, to Green et al., issued Apr. 22, 2008, Inter Partes Review of U.S. Pat. No. 8,944,337, IPR Case No. IPR2016-01763, Exhibit No. 1017, exhibit filed Sep. 9, 2016, pp. 1-28.
U.S. Patent Application Publication No. 2010/0302012, to Bruce B. Roesner, Inter Partes Review of U.S. Pat. No. 8,944,337, IPR Case No. IPR2016-01763, Exhibit No. 1009, exhibit filing date Sep. 9, 2016, pp. 1-14.
Excerpt from '337 file history: Apr. 4, 2014 Non-Final Rejection, Inter Partes Review of U.S. Pat. No. 8,944,337, IPR Case No. IPR2016-01763, Exhibit No. 1010, exhibit filing date Sep. 9, 2016, pp. 1-5.
Excerpt from '337 file history: Nov. 4, 2014 Response After Final Action, Inter Partes Review of U.S. Pat. No. 8,944,337, IPR Case No. IPR2016-01763, Exhibit No. 1011, exhibit filing date Sep. 9, 2016, pp. 1-9.
U.S. Pat. No. 7,571,694, to Rick Boerner, issued Aug. 11, 2009, Inter Partes Review of U.S. Pat. No. 8,944,337, IPR Case No. IPR2016-01763, Exhibit No. 1013, exhibit filing date Sep. 9, 2016, pp. 1-22.
European Patent No. 2230174, to Yoshizaki, issued Sep. 22, 2010, Inter Partes Review of U.S. Pat. No. 8,944,337, IPR Case No. IPR2016-01763, Exhibit No. 1014, exhibit filing date Sep. 9, 2016, pp. 1-23.
U.S. Pat. No. 7,120,987, to Peikang Liu et al., issued Oct. 17, 2006, Inter Partes Review of U.S. Pat. No. 8,944,337, IPR Case No. IPR2016-01763, Exhibit No. 1018, exhibit filing date Sep. 9, 2016, pp. 1-15.

(56) References Cited

OTHER PUBLICATIONS

Excerpt from '337 file history: Nov. 14, 2014 Notice of Allowance, Inter Partes Review of U.S. Pat. No. 8,944,337, IPR Case No. IPR2016-01763, Exhibit No. 1019, exhibit filing date Sep. 9, 2016, pp. 1-8.
U.S. Patent Application Publication No. 2010/0283690, to Artigue et al., Inter Partes Review of U.S. Pat. No. 8,944,337, IPR Case No. IPR2016-01763, Exhibit No. 1020, exhibit filing date Sep. 9, 2016, pp. 1-12.
Petition, Inter Partes Review of U.S. Pat. No. 8,944,337, IPR Case No. IPR2016-01763, Paper No. 1, filing date Sep. 9, 2016, pp. 1-87.
Preliminary Response, Inter Partes Review of U.S. Pat. No. 8,944,337, IPR Case No. IPR2016-01763, Paper No. 7, filing date Dec. 22, 2016, pp. 1-62.
U.S. Patent Application Publication No. 2004/0242285 A1, to Farshi, Pub. Date Dec. 2, 2004, Inter Partes Review of U.S. Pat. No. 8,944,337, IPR Case No. IPR2016-01763, Exhibit No. 2006, exhibit filing date Dec. 22, 2016, pp. 1-9.
Reference Designer Chapter 4.1 Impedance of Capacitor 2009, Inter Partes Review of U.S. Pat. No. 8,944,337, IPR Case No. IPR2016-01763, Exhibit No. 2009, exhibit filing date Dec. 22, 2016, pp. 1-2.
Fischer Declaration ISO Patent Owners Preliminary Response, Inter Partes Review of U.S. Pat. No. 8,944,337, IPR Case No. IPR2016-01763, Exhibit No. 2002, exhibit filing date Dec. 22, 2016, pp. 1-124.
PCT International Publication No. 2003/079487 A1, to Roshchupkin, Inter Partes Review of U.S. Pat. No. 8,944,337, IPR Case No. IPR2016-01763, Exhibit No. 2003, Exhibit filing date Dec. 22, 2016, pp. 1-38.
Poynting, Universal Modem-to-Antenna Adaptor, Inter Partes Review of U.S. Pat. No. 8,944,337, IPR Case No. IPR2016-01763, Exhibit No. 2004, exhibit filing date Dec. 22, 2016, pp. 1-2.
U.S. Pat. No. 7,437,148 B1, to Vaghi et al., issued Oct. 14, 2008, Inter Partes Review of U.S. Pat. No. 8,944,337, IPR Case No. IPR2016-01763, Exhibit No. 2005, exhibit filing date Dec. 22, 2016, pp. 1-28.
U.S. Pat. No. 5,659,324, to Taniguchi et al., issued Aug. 19, 1997, Inter Partes Review of U.S. Pat. No. 8,944,337, IPR Case No. IPR2016-01763, Exhibit No. 2007, exhibit filing date Dec. 22, 2016, pp. 1-79.
Lee et al., Designing Antenna Booster Cases for Mobile Phones using Capacitive Coupling Techniques 2015, Inter Partes Review of U.S. Pat. No. 8,944,337, IPR Case No. IPR2016-01763, Exhibit No. 2008, exhibit filing date Dec. 22, 2016, pp. 1-2.
Reference Designer Chapter 4.1 Parallel Plate Capacitor 2009, Inter Partes Review of U.S. Pat. No. 8,944,337, IPR Case No. IPR2016-01763, Exhibit No. 2010, exhibit filing date Dec. 22, 2016, p. 1.
Finkenzeller, RFID Handbook Fundamentals and Applications in Contactless Smart Cards and Identification, 2nd Ed. 1999 Copyright pages and Chapters 2-4, Inter Partes Review of U.S. Pat. No. 8,944,337, IPR Case No. IPR2016-01763, Exhibit No. 2011, exhibit filing date Dec. 22, 2016, pp. 1-154.
U.S. Pat. No. 8,416,079 B2, to Roesner, issued on Apr. 9, 2013, Inter Partes Review of U.S. Pat. No. 8,944,337, IPR Case No. IPR2016-01763, Exhibit No. 2012, exhibit filing date Dec. 22, 2016, pp. 1-18.
Response to IPR, Inter Partes Review of U.S. Pat. No. 8,944,337, IPR Case No. IPR2016-01763, Paper No. 12, filing date Jun. 21, 2017, pp. 1-63.

PCT International Publication No. 2008/074050 A1, to Peter Samuel Atherton, Inter Partes Review of U.S. Pat. No. 8,944,337, IPR Case No. IPR2016-01763, Exhibit No. 2014, exhibit filing date Jun. 21, 2017, pp. 1-21.
Malmstadt et al., Electronics for Scientists: Principles and Experiments for Those Who Use Instruments, Inter Partes Review of U.S. Pat. No. 8,944,337, IPR Case No. IPR2016-01763, Exhibit No. 2019, exhibit filing date Jun. 21, 2017, pp. 1-3.
Boylestad, Introductory Circuit Analysis, Inter Partes Review of U.S. Pat. No. 8,944,337, IPR Case No. IPR2016-01763, Exhibit No. 2020, exhibit filing date Jun. 21, 2017, pp. 1-3.
Holt et al., Physics 1999, Inter Partes Review of U.S. Pat. No. 8,944,337, IPR Case No. IPR2016-01763, Exhibit No. 2032, exhibit filing date Jun. 21, 2017, pp. 1-4.
Glossary of RFID Terms May 22, 2013, Inter Partes Review of U.S. Pat. No. 8,944,337, IPR Case No. IPR2016-01763, Exhibit No. 2033, exhibit filing date Jun. 21, 2017, pp. 1-3.
EPC based RFID Item Level Tagging, Inter Partes Review of U.S. Pat. No. 8,944,337, IPR Case No. IPR2016-01763, Exhibit No. 2013, exhibit filing date Jun. 21, 2017, pp. 1-56.
Clifford, How to Read Circuit Diagrams and Electronic Graphs, Inter Partes Review of U.S. Pat. No. 8,944,337, IPR Case No. IPR2016-01763, Exhibit No. 2015, exhibit filing date Jun. 21, 2017, pp. 1-8.
Boylestad, Introductory Circuit Analysis, Inter Partes Review of U.S. Pat. No. 8,944,337, IPR Case No. IPR2016-01763, Exhibit No. 2016, exhibit filing date Jun. 21, 2017, pp. 1-3.
Johnson et al., Introductory Electric Circuit Analysis, Inter Partes Review of U.S. Pat. No. 8,944,337, IPR Case No. IPR2016-01763, Exhibit No. 2018, exhibit filing date Jun. 21, 2017, pp. 1-12.
Fischer Declaration ISO Patent Owners Response to Petition, Inter Partes Review of U.S. Pat. No. 8,944,337, IPR Case No. IPR2016-01763, Exhibit No. 2028, exhibit filing date Jun. 21, 2017, pp. 1-87.
Mazda, F.F., Discrete Electronics Components, 1981, Inter Partes Review of U.S. Pat. No. 8,944,337, IPR Case No. IPR2016-01763, Exhibit No. 2031, exhibit filing date Jun. 21, 2017, pp. 1-11.
Motion to Amend Claims, Inter Partes Review of U.S. Pat. No. 8,944,337, IPR Case No. IPR2016-01763, Paper No. 13, filing date Jun. 21, 2017, pp. 1-35.
586 Application, to Mullis et al., Inter Partes Review of U.S. Pat. No. 8,944,337, IPR Case No. IPR2016-01763, Exhibit No. 2023, exhibit filing date Jun. 21, 2017, pp. 1-17.
372 Application, to Mullis et al., Inter Partes Review of U.S. Pat. No. 8,944,337, IPR Case No. IPR2016-01763, Exhibit No. 2024, exhibit filing date Jun. 21, 2017, pp. 1-20.
U.S. Patent Application Publication No. 2012/0280045 A1, to Mullis et al., Inter Partes Review of U.S. Pat. No. 8,944,337, IPR Case No. IPR2016-01763, Exhibit No. 2025, exhibit filing date Jun. 21, 2017, pp. 1-17.
U.S. Patent Application Publication No. 2014/0175177 A1, to Mullis et al., Inter Partes Review of U.S. Pat. No. 8,944,337, IPR Case No. IPR2016-01763, Exhibit No. 2026, exhibit filing date Jun. 21, 2017, pp. 1-16.
U.S. Pat. No. 7,782,206 B2, to Burnett et al., Inter Partes Review of U.S. Pat. No. 8,944,337, IPR Case No. IPR2016-01763, Exhibit No. 2021, exhibit filing date Jun. 21, 2017, pp. 1-10.
U.S. Patent Application Publication No. 2005/0134461 A1, to Gelbman et al., Inter Partes Review of U.S. Pat. No. 8,944,337, IPR Case No. IPR2016-01763, Exhibit No. 2022, exhibit filing date Jun. 21, 2017, pp. 1-27.
Fischer Declaration ISO Patent Owners Contingent Motion to Amend Claims, Inter Partes Review of U.S. Pat. No. 8,944,337, IPR Case No. IPR2016-01763, Exhibit No. 2029, exhibit filing date Jun. 21, 2017, pp. 1-51.

SELF DECLARING DEVICE FOR A VEHICLE USING RESTRICT TRAFFIC LANES

PRIORITY CLAIM AND RELATED PATENT APPLICATIONS

This application is a Continuation application of U.S. patent application Ser. No. 16/147,114 filed Sep. 28, 2018, now U.S. Pat. No. 10,388,079 issued Aug. 20, 2019, which, in turn, is a Continuation application of U.S. patent application Ser. No. 15/225,779 filed Aug. 1, 2016, now U.S. Pat. No. 10,102,685 issued Oct. 16, 2018, which claims priority under 35 U.S.C. 119(e) to U.S. Patent Application No. 62/199,993 entitled "SELF DECLARING DEVICE" and filed on Aug. 1, 2015. U.S. patent application Ser. No. 15/225,779 also claims priority under U.S.C. 120 as a continuation-in-part to Ser. No. 14/578,196, entitled "RFID SWITCH TAG," filed Dec. 19, 2014, now U.S. Pat. No. 9,582,746, issued Feb. 28, 2017, which in turn is a Continuation application of U.S. patent application Ser. No. 14/060,407, now U.S. Pat. No. 8,944,337, issued Feb. 3, 2015, entitled "RFID SWITCH TAG," filed Oct. 22, 2013, which in turn is a Continuation application of U.S. patent application Ser. No. 13/465,834, now U.S. Pat. No. 8,561,911, issued Oct. 22, 2013, entitled "RFID SWITCH TAG," filed May 7, 2012, which in turn claims priority to U.S. Provisional Patent Application Nos. 61/487,372 and 61/483,586, both entitled "RFID SWITCH TAG," filed May 18, 2011 and May 6, 2011, respectively. The disclosures of the above application are incorporated by reference in their entirety as a part of this document.

BACKGROUND

1. Technical Field

The various embodiments described herein generally relate to wireless devices, and more particularly to a self-declaring wireless device to be used on a vehicle to automatically declare occupancy information.

2. Related Art

In various jurisdictions around the world, high occupancy vehicle (HOV) lanes or carpool lanes are generally restricted traffic lanes reserved for exclusive use by vehicles carrying two or more occupants typically during peak commute times. Meanwhile, high occupancy toll (HOT) lanes are becoming a more prevalent feature on modern roadways. In contrast to HOV lanes, single occupancy vehicles (SOVs) may be able to pay a fee (e.g., toll) to travel on HOT lanes.

A conventional HOT system relies on radio frequency identification (RFID) enabled electronic toll collection (ETC) readers and tags. To pay the required toll, an SOV motorist may be required to switch on an onboard ETC tag when entering a HOT lane. Despite oversight from law enforcement officials, motorists are nevertheless expected to comply with HOV/HOT rules under a self-imposed "honor system." As such, HOV/HOT enforcement tends to be inconsistent, inconvenient, and ultimately ineffective.

SUMMARY

Embodiments described herein provide various examples of a self-declaring wireless device installed on a vehicle operable to automatically detect, determine and declare occupancy information of the vehicle traveling on a restricted traffic lane to an electronic toll collection (ETC) system.

According to one aspect, a self-declaring device installed on a vehicle is provided. This self-declaring device includes a sensor module configured to collect data from inside the vehicle; a wireless transceiver configured to communicate with an electronic toll collection (ETC) system; and a microcontroller coupled to both the sensor module and the wireless transceiver and configured to: receive at least a portion of data collected by the sensor module; determine occupancy data based at least in part on the at least a portion of data; and change an operation state of the wireless transceiver based at least on the determined occupancy data.

According to another aspect, a process for performing self-declaration by a vehicle traveling on a restricted traffic lane is provided. This process includes: receiving sensor data collected by one or more sensors installed on the vehicle; determining occupancy data of the vehicle based at least on the received sensor data; and controlling a wireless transceiver installed on the vehicle to communicate with an electronic toll collection (ETC) system associated with the restricted traffic lane based at least on the determined occupancy data.

Other features and advantages of the present inventive concept should be apparent from the following description which illustrates by way of example aspects of the present inventive concept.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

While certain embodiments are described, these embodiments are presented by way of example only, and are not intended to limit the scope of the embodiments described or claims included herein. The methods and systems described herein may be embodied in a variety of other forms. Furthermore, various omissions, substitutions, and changes in the form of the example methods and systems described herein may be made without departing from the scope of protection.

Embodiments described herein provide various examples of a self-declaring wireless device installed on a vehicle operable to automatically detect, determine and declare occupancy information of the vehicle traveling on a restricted traffic lane to an electronic toll collection (ETC) system. Comparing to a manual-declaring device, which operates based on an honor system, the disclosed self-declaring device can be fully automatic, highly reliable and accurate without relying on human honesty. Vehicles using the disclosed self-declaring wireless device can bypass visual checks by law enforcement. As a result, the disclosed self-declaring wireless device allows for consistent, convenient, and high effective HOV/HOT lane enforcement.

According to one aspect, a self-declaring device installed on a vehicle is provided. This self-declaring device includes a sensor module configured to collect data from inside the vehicle; a wireless transceiver configured to communicate with an electronic toll collection (ETC) system; and a microcontroller coupled to both the sensor module and the wireless transceiver and configured to: receive at least a portion of data collected by the sensor module; determine occupancy data based at least in part on the at least a portion of data; and change an operation state of the wireless transceiver based at least on the determined occupancy data.

According to another aspect, a process for performing self-declaration by a vehicle traveling on a restricted traffic lane is provided. This process includes: receiving sensor data collected by one or more sensors installed on the vehicle; determining occupancy data of the vehicle based at least on the received sensor data; and controlling a wireless transceiver installed on the vehicle to communicate with an electronic toll collection (ETC) system associated with the restricted traffic lane based at least on the determined occupancy data.

Figure 1:
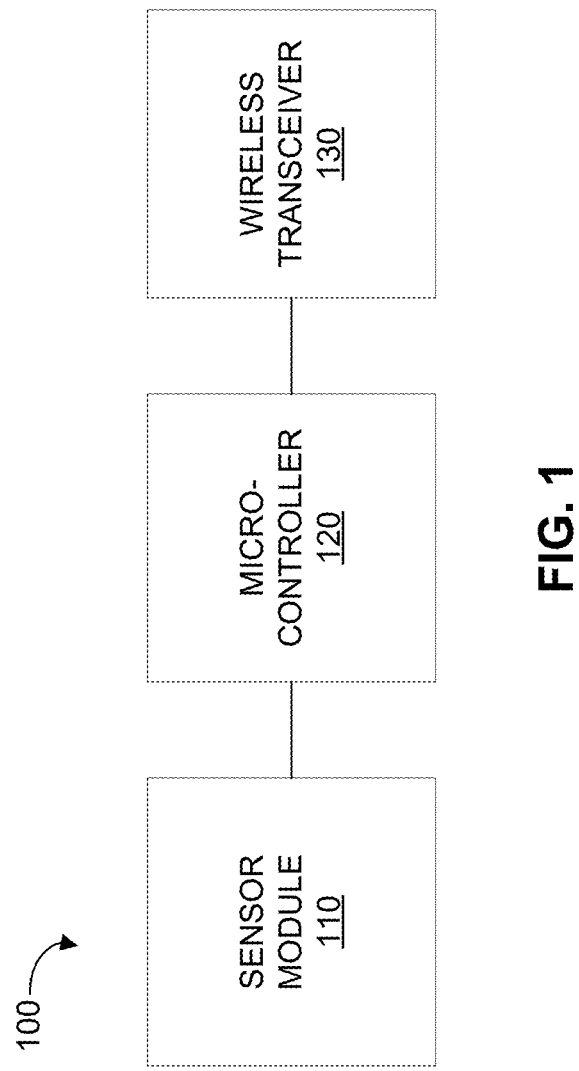
FIG. 1 shows a block diagram of an exemplary self-declaring device in accordance with one embodiment described herein.

FIG. 1 shows a block diagram of an exemplary self-declaring device 100 in accordance with one embodiment described herein. Referring to FIG. 1, self-declaring device 100 includes a sensor module 110, a microcontroller 120, and a wireless transceiver 130, which are coupled to each other by wired connections, wireless connections, or a combination of both.

Sensor module 110 can include one or more sensors including, but not limited to, a motion sensor, an infrared (IR) sensor, and an image sensor. When self-declaring device 100 is installed on a vehicle, sensor module 110 can detect and collect data inside the vehicle that can be used to determine a number of occupants in the vehicle. For example, if sensor module 110 includes a motion sensor, sensor module 110 can acquire motion information inside the vehicle. Note that motion sensors that can be used within sensor module 110 can include any types of motion sensors which can detect human movement inside a vehicle, which can include, but are not limited to a passive IR sensor, a microwave sensor, an ultrasonic sensor, an acoustic sensor, and a vibration sensor. Alternatively, if sensor module 110 includes an IR sensor, sensor module 110 can acquire IR images, such as thermal images inside the vehicle. Alternatively, if sensor module 110 includes an image sensor, such as a CCD or CMOS camera, sensor module 110 can acquire optical images inside the vehicle. In some embodiments, sensor module 110 can include more than one of the same type of sensors described above. For example, sensor module 110 can include two or more motion sensors, two or more IR sensors, or two or more image sensors. In other embodiments, sensor module 110 can include a combination of different types of sensors. For example, sensor module 110 can include both an IR sensor and an optical image sensor. In this example, sensor module 110 can use the IR sensor to collect data inside the vehicle at night and use the optical image sensor to collect data inside the vehicle during the daytime.

In some embodiments, sensor module 110 is installed at a location in the vehicle such that the one or more sensors in sensor module 110 can detect intended signals from every seat inside the vehicle. For example, sensor module 110 can be installed near an upper portion of the windshield. If sensor module 110 includes two or more sensors, the two or more sensors can be placed at the same location within the vehicle, or they can be placed at different locations within the vehicle. For example, if sensor module 110 includes two sensors, the first sensor can be installed in the front of the vehicle while the second sensor can be installed in the back of the vehicle.

In various embodiments, sensor module 110 can be configured to transmit at least some of the collected data to microcontroller 120. For example, sensor module 110 can transmit the collected data through a wired or wireless connection to microcontroller 120. In some embodiments, microcontroller 120 is implemented as a field-programmable gate array (FPGA) or one or more application specific integrated circuits (ASICs). In other embodiments, microcontroller 120 is a microprocessor chip such as a CPU. In some embodiments, microcontroller 120 is implemented as a System on Chip (SoC).

In some embodiments, microcontroller 120 is configured to receive the data detected and collected by sensor module 110 (or "sensor data" hereinafter) and to automatically determine a number of occupants in the vehicle based on the received sensor data. For example, if the sensor data include photographic images captured by an image sensor, microcontroller 120 can use an imaging processing module to process the photographic images to determine a number of occupants in the vehicle. In these embodiments, microcontroller 120 can further determine, based on determined number of occupants, whether the vehicle is an SOV or an HOV. In some embodiments, microcontroller 120 can also determine whether the number of occupants in the vehicle exceeds a minimum number of occupants required for a specific HOV lane access in a given jurisdiction.

In some embodiments, microcontroller 120 is further configured to control an operation of wireless transceiver 130, including making a self-declaration to an ETC system. For example, microcontroller 120 can change an operation state (e.g., on/off states) of wireless transceiver 130 based on the determined occupancy data. In one embodiment, if it is determined by microcontroller 120 that the number of occupants in the vehicle does not meet or exceed the minimum number of occupants required by an HOT lane, microcontroller 120 can be configured to change the operation state of wireless transceiver 130 so that wireless transceiver 130 can communicate relevant data, such as the determined number of occupants (i.e., making a self-declaration) and payment information, to a HOT lane reader. Alternatively, if it is determined by microcontroller 120 that the number of occupants in the vehicle does meet or exceeds the minimum number of occupants required by a HOT lane, microcontroller 120 can be configured to control wireless transceiver 130 so that wireless transceiver 130 either does not self-declare to a HOT lane reader or only communicates the determined number of occupants to a HOT lane reader without making any payment.

According to one exemplary embodiment, wireless transceiver 130 can operate at multiple frequencies, such as a high-frequency (HF) and an ultra-high frequency (UHF). In this embodiment, microcontroller 120 can change the operation state of wireless transceiver 130 by changing the operation frequency of wireless transceiver 130. Alternately or in addition, in some embodiments, microcontroller 120 can transmit the determined occupancy data (e.g., number of occupants, HOV compliance information) to wireless transceiver 130. Wireless transceiver 130 can subsequently transmit at least a portion of the occupancy data to an ETC toll reader, such as a HOT lane reader.

In some embodiments, wireless transceiver 130 includes one or more wireless communication modules, which can include, but not limited to, a radio frequency identification (RFID) module (such as an RFID transponder), a WI-FI module, a ZigBee module, and a Bluetooth® module. In one embodiment, wireless transceiver 130 is configured to both transmit data to and receive data from a corresponding reader (e.g., an ETC toll reader). Wireless transceiver 130 can use a wired or a wireless connection to receive commands and data from microcontroller 120. As mentioned above, wireless transceiver 130 can receive a command from microcontroller 120 to change an operation state, which can include an ON/OFF state. For example, wireless transceiver 130 can be turned from an OFF state to an ON state to enable data transmission, including making self-declaration, after receiving a command from microcontroller 120. Moreover, wireless transceiver 130 can receive data from microcontroller 120 and to subsequently transmit at least a portion of the received data, including data for self-declaration. For example, wireless transceiver 130 can receive determined occupancy data from microcontroller 120 and subsequently transmit the determined occupancy data to a HOT lane reader as self-declaration. Wireless transceiver 130 can be strategically positioned on a vehicle to facilitate communicating with an ETC toll reader. For example, wireless transceiver 130 can be placed on the windshield or integrated with the license plate. In some embodiments, wireless transceiver 130 includes an RFID transponder.

Embodiments of an RFID-enabled license plate (i.e., a license plate with the integrated wireless transceiver 130) are described in U.S. Pat. Nos. 8,344,890 and 9,007,215, and U.S. patent application Ser. No. 15/093,636 the disclosures of which are incorporated by reference herein in their entirety.

It will be appreciated that sensor module 110, microcontroller 120, and wireless transceiver 130 can be coupled with each other via a wired and/or wireless connection. As such, in some embodiments, sensor module 110, microcontroller 120, and wireless transceiver 130 can be placed at different locations on the vehicle. For example, sensor module 110 and/or the microcontroller 120 can be placed within the cabin of the vehicle while wireless transceiver 130 can be integrated into a front and/or rear license plate. In other embodiments, sensor module 110, microcontroller 120, and wireless transceiver 130 are integrated into a single package inside a protective case. In these embodiments, the self-declaration device 100 can be placed at a location on a vehicle to facilitate both the operation of sensor module 110 and the operation of wireless transceiver 130.

In some embodiments, wireless transceiver 130 can include at least one RFID module configured to interface with multiple RFID systems at different frequencies. Multi-frequency RFID tags are described in Reissued U.S. Pat. Nos. RE 43,355 and RE 44,691, the disclosures of which are incorporated by reference herein in their respective entirety. According to one exemplary embodiment, microcontroller 120 can change the operation state of wireless transceiver 130 by changing the operation frequency of the wireless transceiver 130.

Figure 2:
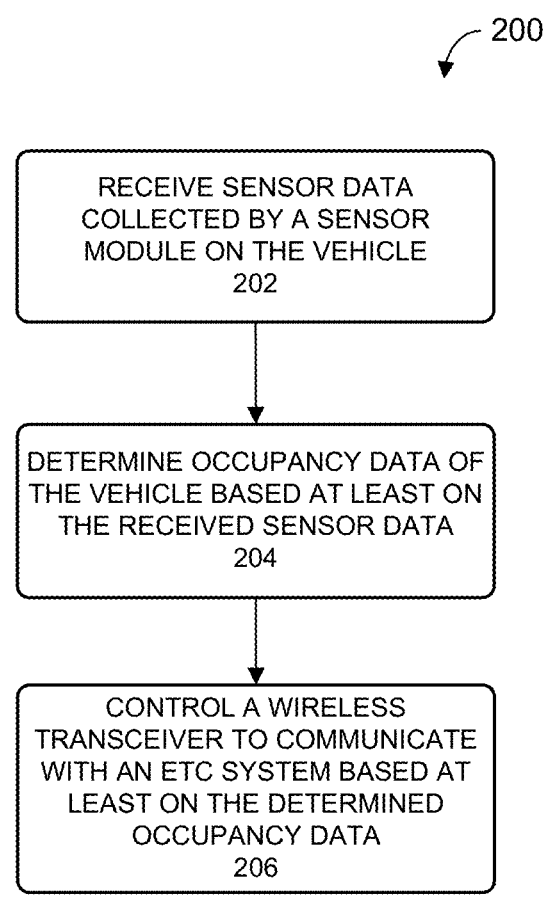
FIG. 2 presents a flowchart illustrating a process for making a self-declaration by a vehicle equipped with the disclosed self-declaring device in accordance with one embodiment described he.

FIG. 2 presents a flowchart illustrating a process 200 for making a self-declaration by a vehicle equipped with self-declaring device 100 in accordance with one embodiment described herein. In some embodiments, process 200 is specifically performed by microcontroller 120 within self-declaring device 100, and is performed when the vehicle is traveling on a restricted traffic lane.

As can be seen in FIG. 2, process 200 begins with microcontroller 120 receiving at least a portion of sensor data collected by sensor module 110 installed on the vehicle (step 202). For example, microcontroller 120 can receive the sensor data from one or more sensors included in sensor module 110, which can include but not limited to, one or more motion sensors, one or more IR sensors, and one or more image sensors. As mentioned above, sensor module 110 can detect and collect data inside the vehicle that can be used to determine a number of occupants in the vehicle.

Next in process 200, microcontroller 120 determines occupancy data of the vehicle based at least on the received sensor data (step 204). For example, microcontroller 120 can determine a number of occupants in the vehicle based on the sensor data. Microcontroller 120 can also determine, based on the received sensor data, whether the vehicle is an SOV or an HOV. In some embodiments, microcontroller 120 can also determine whether the determined number of occupants in the vehicle meets or exceeds a minimum number of occupants required for a specific HOT lane access in a given jurisdiction.

Next in process 200, microcontroller 120 controls wireless transceiver 130 to communicate with an ETC system associated with the restricted traffic lane based at least on the determined occupancy data (step 206). Note that in step 206, a self-declaration is included when the communication between wireless transceiver 130 and the ETC system includes transmitting occupancy information from transceiver 130 to the ETC system. In some embodiments, controlling wireless transceiver 130 includes enabling the wireless transceiver to communicate with the ETC system by changing the operation state of wireless transceiver 130. For example, wireless transceiver 130 can be turned from an OFF state to an ON state to enable data transmission, including making self-declaration, after receiving a command from microcontroller 120. To enable self-declaration in step 206, microcontroller 120 can transmit the determined occupancy data (e.g., number of occupants, HOV compliance information) to wireless transceiver 130. An enabled wireless transceiver 130 can subsequently transmit at least a portion of the occupancy data to the ETC system.

In some embodiments, microcontroller 120 enables wireless transceiver 130 if the determined number of occupants in the vehicle does not exceed the minimum number of occupants required by the restricted traffic lane. For example, if microcontroller 120 determines that the number of occupants in the vehicle is not greater than one (i.e., SOV), microcontroller 120 can change the operation state of wireless transceiver 130 such that wireless transceiver 130 can communicate with an HOT lane reader, for example, to transmit account information and/or exchanging payment information with the HOT lane reader.

In various embodiments, self-declaring device 100 can be used in one or more account management applications for the vehicle which is equipped with self-declaring device 100. For example, self-declaring device 100 can be used to track the vehicle for purposes of electronic tolling, parking access, and border control. Similar applications are described in U.S. patent Ser. No. 14/459,299, now U.S. Pat. No. 9,355,398 and U.S. patent application Ser. No. 15/167,829, the disclosure of which is incorporated herein by reference in its entirety.

In some embodiments, access to data on self-declaring device 100 can be granted based on a security key. The provision of secure identification solutions is described in U.S. Pat. Nos. 7,081,819, 7,671,746, 8,237,568, 8,322,044, and 8,004,410, the disclosures of which are incorporated by reference herein in their respective entirety.

Some applications would require a placement of metallic material (e.g., retro-reflective material, holographic image)

over self-declaring device 100 and in particular wireless transceiver 130. In order to preserve the transmission and reception capabilities of wireless transceiver 130, a selective de-metallization process can be employed to treat the metallic material. Selective de-metallization is described in U.S. Pat. Nos. 7,034,688 and 7,463,154, the disclosures of which are incorporated by reference herein in their respective entirety.

In certain embodiments, wireless transceiver module can actually comprise multiple modules configured to operate, e.g., at different frequencies depending on which module is activated or capable of transmitting. This is similar to transceiver 130 being configured to operate at different frequencies. In such embodiments, transceiver 130 can be configured to switch frequencies based on the information gathered by sensor module 110. Thus, of the occupancy is determined to be below that required by a HOT lane, then the transceiver module can use one frequency to communicate with a reader on the toll system. If, however, the occupancy is determined to meet or exceed the HOT lane requirements, then the transceiver 130 can communicate using another frequency.

The dual frequencies can be in different bands, e.g., HF and UHF, or can simply be different frequencies within a single band. In other embodiments, different bands can be used for different functions, e.g., tolling versus account management as described, e.g., in U.S. Pat. Nos. RE 43,355 and RE 44,691.

Figure 3:
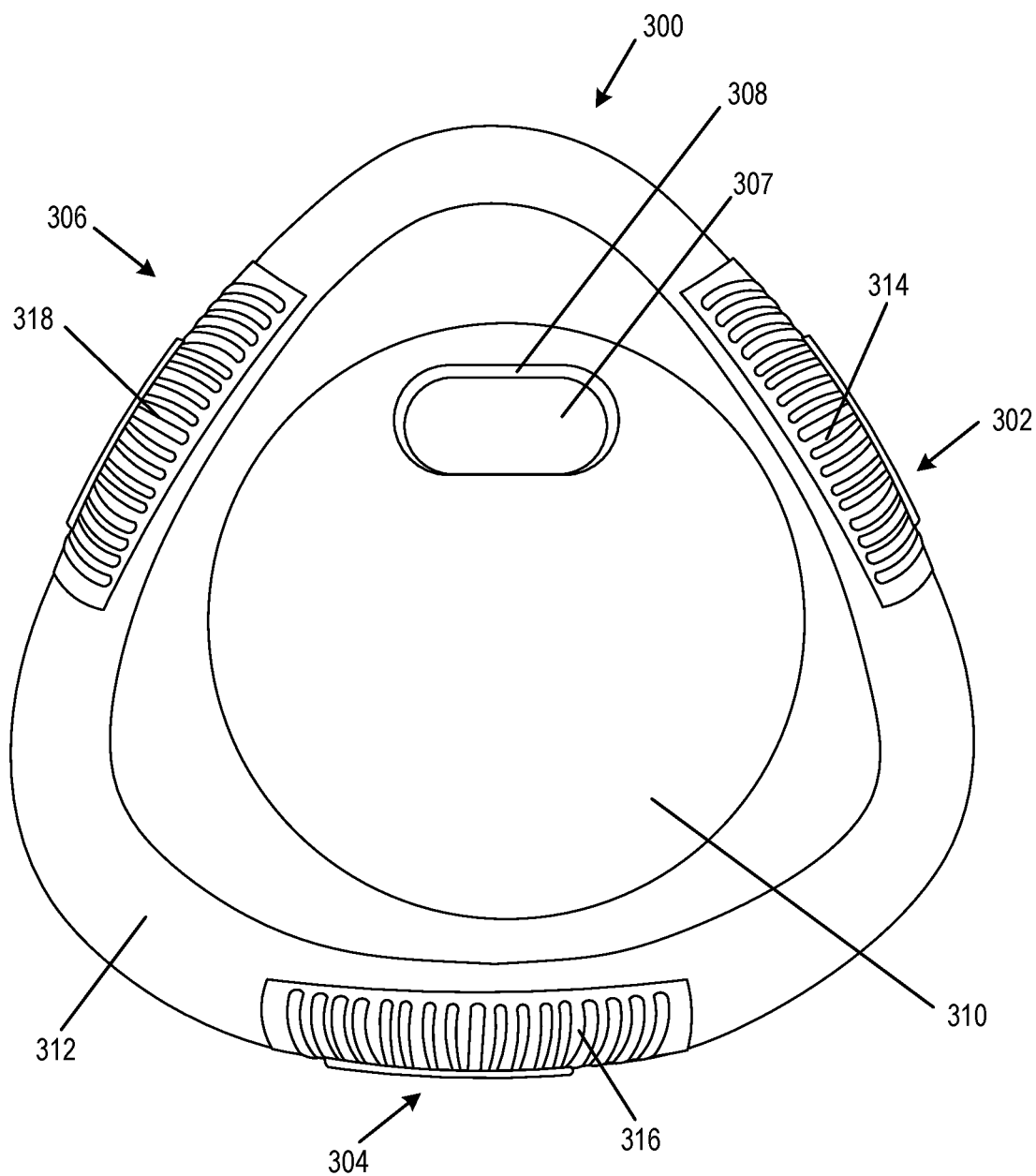
FIGS. 3-5 are images illustrating an example switch tag configured in accordance with one embodiment.
Figure 4:
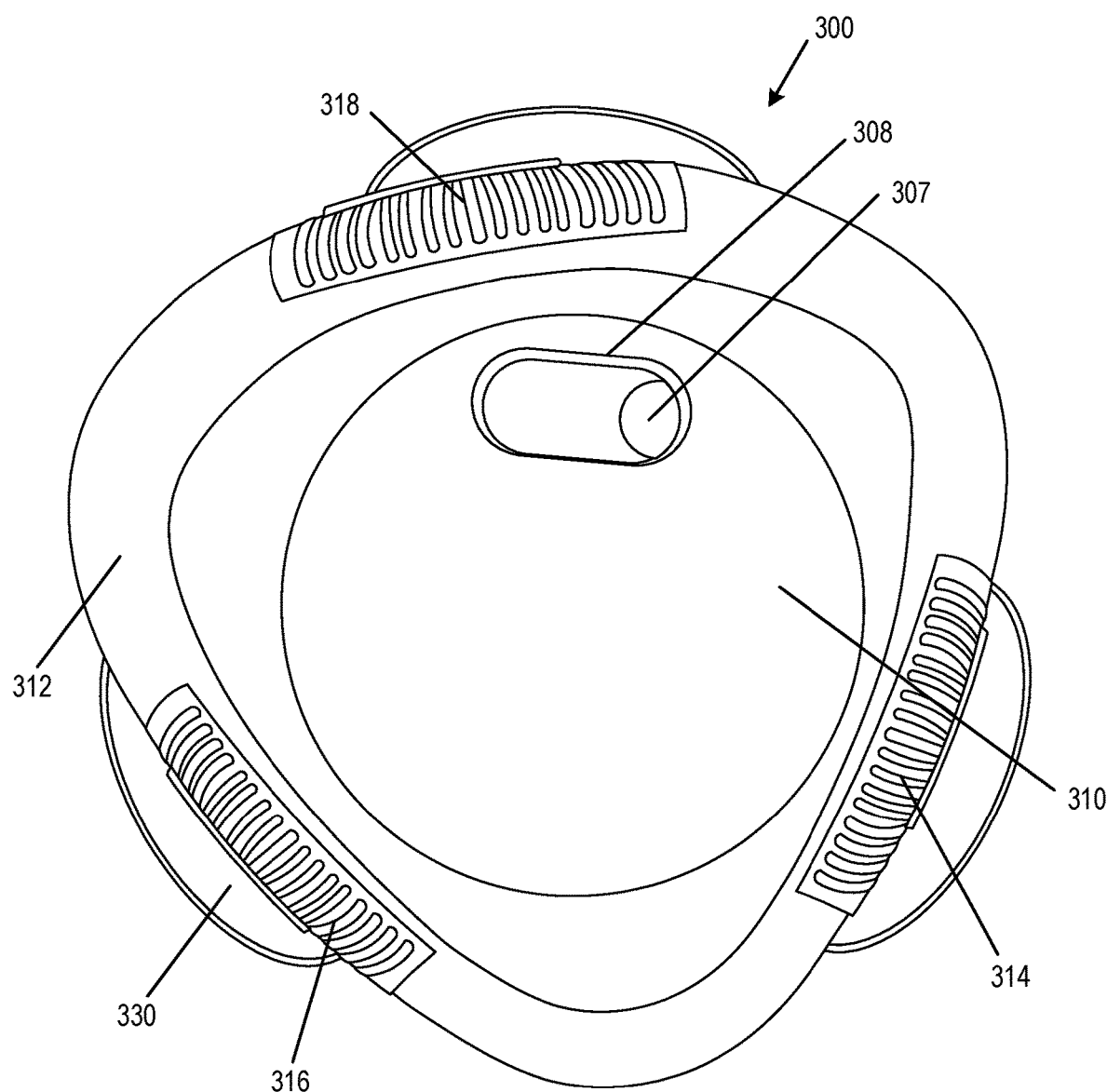
Figure 5:
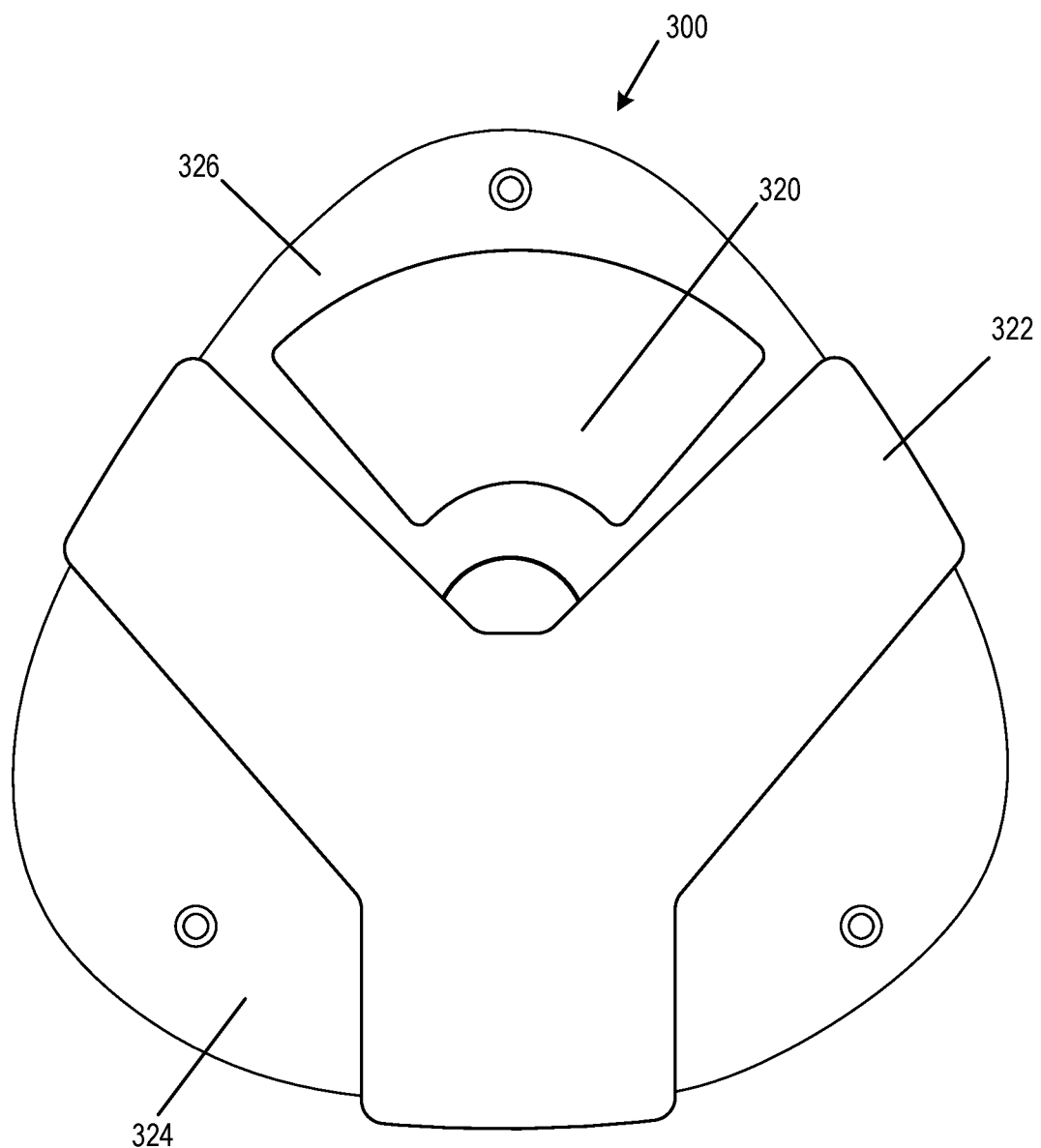

Conversely, a multi module switch tag 300 that can be used for transceiver 130 is illustrated in FIGS. 3-5. Tag 300 can operate substantially similar to the embodiments of the switch tags, e.g., described in the parent '196 application, which is incorporated herein by reference as if set forth in full. Specifically, tag 300 can operate in a similar fashion as that disclosed in FIG. 8 of the '196 application. Thus, tag 300 can comprise a single booster antenna and three RF modules. The modules can be positioned, e.g., at positions 302, 304 and 306 within tag 300. The single booster antenna can be positioned at one positon, e.g., positon 302. The top portion 312 of the body of tag 300 can then be rotated, e.g., using gripping features 314, 316 and 318 to bring the appropriate RF module into positon, such that it is coupled with the booster antenna.

Each RF module can be configured to transmit different data to indicate a different status. For example, one module can be configured to transmit data indicating that the occupancy of the vehicle meets or exceeds that required by a HOT lane, while another can be to transmit data indicating that the occupancy does not meet or exceed that required by the HOT lane. Alternatively, the HOT lane may be configured such that different charges apply depending on the occupancy, such that there are multiple charge levels. Thus, each of the RF modules included in tag 300 can be associated with different occupancy levels or numbers and can therefore transmit information related to the associated occupancy levels or numbers. For example, one RF module can be associated with single occupancy, one with occupancy of 2 people, and the third with an occupancy of three people or more. A user can then rotate top portion 312 to the appropriate position based on the occupancy.

In alternative embodiments, tag 300 can comprise three booster antenna, e.g., configured to operate at different frequencies and single RF module. The different frequencies would then indicate the occupancy level or other settings associated with the positions 302, 304, and 306, respectively.

There should be some indication of which position is associated with what occupancy or other setting. Thus, tag 300 can comprise a window 308 that is configured to reveal a color coded area 307 that is part of top portion 312. Thus, as portion 312 is rotated, portion 310 comprising window 308 remains still. Portion can then include colored areas 307 that are positioned such that a different colored area 307 comes to rest behind window 308 depending on which RF module, or booster antenna is in the operational position.

For example, red can be used to indicate single occupancy and green for multiple occupants. If there are different charges for, e.g., two occupants versus three or more, then a color can be associated with each of two occupants and three or more. The user would then rotate top portion 312 until the appropriate color are 307 appears behind window 308.

FIG. 4 illustrates a rear view of tag 300 in accordance with one embodiment. It should be noted that tag 300 is configured to be mounted in the window of a vehicle with the rear portion 324 facing outward from the vehicle. A mounting bracket or mechanism, such as bracket 322 can be used to mount tag 300 to the window. Bracket 322 can have adhesives, suction devices, Velcro, etc., attached thereto in order to achieve the mounting of tag 300. Back portion 324 can be coupled with portion 310 on the reverse side, such that portions 310 and 324 do not rotate as top portion 312 is rotated.

As can be seen in FIG. 4, in certain embodiments a window 326 can also be included in back portion 324 in order to reveal colored areas 320 on the back surface of top portion 312. The colored areas 320 can match the coloring scheme associated with areas 307 on the front surface of top portion 312. This can enable visual verification and enforcement for authorities. In other words, if a single occupant driver switches the positon of tag 300 to one that indicates multiple occupancy, then the colored area 320 behind window 326 will indicate multiple occupancy. An enforcement official can see the color through window 326 and can confirm whether it is appropriate. For this reason, window 326 is typically larger than window 308, which is only viewed from within the vehicle.

The windows can also be used to detect that the position of tag 300 is off, whether intentionally or not. For example, if the user has not fully rotated top portion 312 to the correct position, then colored are 307 and 320 will not be aligned behind windows 308 and 326 respectively, as illustrated in FIG. 5, providing a visual indicator to both the occupants and enforcement officials that tag 300 is not operational, or appropriately positioned. A top surface of back portion 324 can also be color coded to help indicate misalignment to the occupants.

Thus, the sensor information provided by sensor module 110 can be used to confirm the physical positon of a tag such as tag 300. For example, if a single occupancy driver positons tag 300 to indicate a multiple occupancy setting, then the sensor data would not match the occupancy indication being provided by tag 300. This can cause controller 120 to cause the RF module to transmit some type of error code that indicates that the occupancy information being transmitted is incorrect, or it may cause tag 300 not to transmit at all. In alternative embodiments, wireless transceiver 130 may be separate from tag 300 and may transmit separate information that can be read and compared to that being communicated by tag 300.

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A self-declaring device installed on a vehicle, comprising:
    a housing comprising a wireless transceiver having a plurality of operation states and a first portion and a second portion movable relative to each other, the housing adapted to set a first operation state from the plurality of operation states for the wireless transceiver based on a position of the first portion relative to the second portion;
    a sensor configured to collect data from inside the vehicle; and
    a microcontroller coupled to both the sensor and the wireless transceiver and configured to:
    identify a second operation state of the plurality of operation states for the wireless transceiver based on the collected data; and
    communicate a signal indicative of the identified operation state,
    wherein the first portion comprises the wireless transceiver and the second portion comprises at least one antenna section that couples to the wireless transceiver based on the position of the first portion relative to the second portion.

2. The self-declaring device of claim 1, wherein the first portion comprises a first triangular shaped member and the second portion comprises a second triangular shaped member interfaced with the first triangular shaped member.

3. The self-declaring device of claim 1, wherein one of the first portion and second portion is stationary and other portion is rotatable a longitudinal axis between the plurality of positions, the first portion and second portion aligned along the longitudinal axis.

4. The self-declaring device of claim 3, wherein self-declaring device is disposed within the vehicle and the stationary portion is affixed to a surface of the vehicle, wherein the stationary portion comprises a color coded part indicative of alignment based on the position of the first portion relative to the second portion.

5. The self-declaring device of claim 3, wherein the other portion comprises a window adapted to display a visual indicator indicative of the operation state of the wireless transceiver.

6. The self-declaring device of claim 1, wherein the sensor includes a plurality of sensors of the same type or a combination of different types of sensors, wherein the types of sensors include pressure sensors, motion sensors, infrared (IR) sensors, and image sensors.

7. The self-declaring device of claim 1, wherein the wireless transceiver includes one of the following: a radio frequency identification (RFID) module, a WI-FI module, a ZigBee module, and a Bluetooth® module.

8. The self-declaring device of claim 1, where the microcontroller is further configured to:
determine occupancy data indicative of the number of occupants in the vehicle based at least in part on the data collected by the sensor; and
identify the second operation state based on the occupancy data.

9. The self-declaring device of claim 8, wherein the occupancy data includes a determination of a number of occupants in the vehicle and whether the number of occupants in the vehicle exceeds a predetermined threshold number of occupants.

10. The self-declaring device of claim 8, where the microcontroller is further configured to:
confirm that the identified second operation state corresponds to the first operation state that is based on the position of the second portion relative to the first portion; and
communicate with a reader of an external system via the wireless transceiver based on the confirmation.

11. The self-declaring device of claim 10, wherein, when the first operation state corresponds to the identified second operation state, the microcontroller is further configured to:
communicate with the reader via the first operation state for the wireless transceiver corresponding to the position of the second portion relative to the first portion.

12. The self-declaring device of claim 10, wherein, when the first operation state does not correspond to the identified second operation state, the microcontroller is further configured to:
communicate to the reader, via the wireless transceiver, an error signal indicative that the first operation state does not correspond to the identified second operation state.

13. The self-declaring device of claim 10, wherein, when the first operation state does not correspond to the identified second operation state, the microcontroller is further configured to:
turn the wireless transceiver from an ON state to an OFF state, wherein first operation state corresponds to an ON state.

14. The self-declaring device of claim 1, further comprising a another transceiver, wherein the microcontroller is further configured to:
communicate the signal indicative of the identified second operation state to a reader of an external system.

15. The self-declaring device of claim 1, wherein the wireless transceiver includes an RFID transponder configured to selectively operate at multiple frequencies based on the position of the first portion relative to the second portion, the multiple frequencies comprising a first operating frequency and a second operating frequency for communicating with the reader.

16. The self-declaring device of claim 15, wherein the first operating frequency is a high-frequency and the second operating frequency is an ultra-high frequency.

17. A device installed on a vehicle, comprising:
a housing comprising a wireless transceiver having a plurality of operation states and a first portion and a second portion movable amongst a plurality of position relative to each other, the housing adapted to set an operation state from the plurality of operation states for the wireless transceiver for communication with a reader of an electronic toll collection (ETC) system based on moving the first portion amongst the a plurality of positions relative to the second portion;
a sensor configured to collect data from inside the vehicle; and
a microcontroller coupled to both the sensor and the wireless transceiver and configured to:
determine occupancy data indicative of the number of occupants in the vehicle based at least in part on the data collected by the sensor;
confirm the set operation state corresponds to the number of occupants in the vehicle based on the occupancy data; and
communicate a signal indicative of whether the set operation state corresponds to the number of occupants in the vehicle.

18. The device of claim 17, wherein the occupancy data includes a determination of a number of occupants in the vehicle and whether the number of occupants in the vehicle exceeds a predetermined threshold number of occupants.

19. The device of claim 17, wherein the signal is communicated to the ETC system via at least one of the wireless transceiver or a separate wireless transceiver.

* * * * *